Patented Feb. 18, 1941

2,232,405

UNITED STATES PATENT OFFICE 2,232,405

PROCESS AND PREPARATION FOR THE MANUFACTURE OF AZO DYESTUFFS

Albert Schmelzer, Cologne-Mulheim, Germany, assignor to General Aniline & Film Corporation, a corporation of Delaware No Drawing. Application November 26, 1938, Serial No. 242,575. In Germany December 1, 1937

13 Claims. (Cl. 8—45)

The present invention relates to a process and preparations for the manufacture of azo dyestuffs.

According to a known process azo dyestuffs can be produced by:

(a) Dissolving in fixed alkalies, as for instance in sodium hydroxide solution, mixtures of coupling components and such diazoamino compounds as contain in the radical not taking part in the formation of the dyestuff water solubilizing groups, (b) Applying these solutions, if desired, after adding thickening agents or other additions, to the fibre by printing or slop-padding, and (c) Exposing the fibre thereupon to the action of acid vapors at an elevated temperature.

Under the conditions applied in the last step splitting of the diazoamino compounds as well as coupling of the thus formed diazo compounds with the coupling components occurs. This after-treatment with acid vapors involves disadvantages; therefore various attempts have been made to compose the preparations in such a manner that by simply steaming pH-values necessary for splitting up and coupling are obtained. These attempts are, as a rule, based upon incorporating in the preparations in different manner such bases as are volatile with steam, and which can be removed by steaming (cf. e. g. U. S. Patent 2,125,087, British Specification No. 436,371). By expelling the volatile bases in the preparations or on the materials printed therewith the decisive conditions for the formation of the dyestuffs are produced which are otherwise only achieved by an acid after-treatment. As suitable volatile bases for this purpose hitherto first of all alkylamines, as for instance diethyl amine, have been proposed.

Since these bases give out an offensive smell, the problem exists to find out special bases which on the one side are free from this disadvantage and on the other side meet the technical requirements.

It has now been found that compounds meeting all requirements are oxygen-containing organic bases as far as they are water-soluble and sufficiently volatile with steam. Suitable bases of this kind are, e. g.: monoethylaminoethanol, diethylaminoethanol, N-propylaminoethanol, dimethylaminoethanol, dimethylaminobutanone, diethylaminoethanolmethyl ether, N-oxethylpyrrolidine. All these bases have in common that they are practically free from smell, toxically indifferent and water-soluble and besides also sufficiently volatile with steam to warrant development within the usual steaming period of about 3 to 5 minutes. According to the above the present invention consists in using in all preparations and processes of the described kind, in which a development of the dyestuff can be effected by simply expelling volatile bases, e. g. by steaming, as volatile bases oxygen-containing, water-soluble amines being volatile with steam. These bases may be used within the scope of the mentioned preparations and processes in the most many-sided manner. Thus it is possible to employ them in the form of salts with the diazoamino compounds, i. e. in the manner described in Patent 2,125,087. The mentioned oxygen-containing bases may also be used to keep the coupling components in solution, leaving undecided, whether or not this is due to salt-formation. Finally within the scope of the present invention all otherwise usual modifications of these processes may be carried through. Thus for instance substances of buffer action such as magnesium compounds, zinc compounds or others may be added. The nature of the stabilisers contained in the diazoamino compounds is of no importance provided that these stabilisers contain watersolubilising groups. As examples for suitable stabilisers may be mentioned aliphatic, aromatic and heterocyclic amino carboxylic acids or amino sulfonic acids or amino-sulfo-carboxylic acids. Further such stabilisers may be employed the watersolubility of which is due to an accumulation of hydroxy groups. Suitable coupling components are the usual components employed in the ice-colour process, as e. g. the arylides of β-hydroxynaphthoic acid or of ortho-hydroxy-carboxylic acids of higher ring systems or acetoacetic acid arylides or keto-methylene compounds, capable of coupling as e. g. pyrazolones.

A preferred form of my invention is to dissolve in the said volatile, oxygen-containing, water-soluble organic bases the dye compositions as they are usually put on the market representing essentially a mixture of diazoamino compound and coupling component, instead of dissolving them in sodium hydroxide solution as has been done hitherto. This equally applies to the commercial products regardless whether the diazoamino compounds therein are in the form of alkali metal salts,—this is the case when the above-mentioned amino carboxylic or sulfonic or sulfocarboxylic acids have been used as stabilisers—, or contain as stabilisers compounds the solubility of which is due to the accumulation of hydroxy groups.

The following examples illustrate the invention, without, however, restricting it thereto, the parts being by weight.

Example 1

A printing paste consisting of 28 parts of 2.3 hydroxynaphthoyl-1'-amino-2'-methylbenzene,
50 parts of the diazoamino compound from diazotised 4-chloro-2-toluidine and ammonium 4-sulfo-2-aminobenzoate of the following constitution:

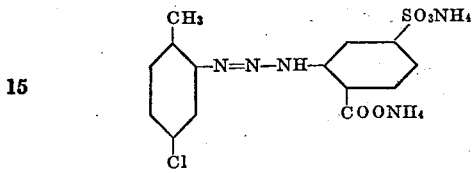

50 parts of glycol monoethylether,
120 parts of diethylaminoethanol,
252 parts of water and
500 parts of neutral starch-tragacanth thickener is printed on the fiber and thereupon dried at 50–60° C. The print is steamed in the Mather-Platt for about 3–5 minutes and rinsed and soaped as usual. A clear red is obtained. The described printing paste is stable when kept for a longer time.

Example 2

A printing paste consisting of 31 parts of 2.3-hydroxynaphthoyl-1'-amino-2'-ethoxybenzene,
65 parts of the diazoamino compound from diazotised 4-chloro-2-toluidine and magnesium-4-sulfo-2-aminobenzoate of the following constitution:

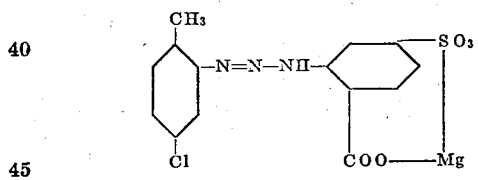

50 parts of glycol monoethylether,
120 parts of diethylaminoethanol or diethylaminoethanolmethylether,
234 parts of water and
500 parts of neutral starch-tragacanth thickener is printed on the fabric. The print is developed according to Example 1, rinsed and soaped. A clear full scarlet is obtained. The printing paste is stable.

Example 3

When using 28 parts of 2.3-hydroxynaphthoyl-1'-amino-2'-methylbenzene, and
65 parts of the diazoamino compound employed in Example 2 a printing paste is obtained in the manner described in Example 2, yielding on the fiber, when treated as mentioned in this example, a clear full red. The printing paste is stable.

Example 4

In using 9.5 parts of 3.3'-dimethyl-diacetoacetyl-4.4'-diamino-diphenyl and
32.5 parts of the diazoamino compound employed in Example 2 a printing paste is prepared according to Example 2, which yields in printing on the fiber in the manner described a full yellow.

Example 5

When using 13 parts of 2.3-hydroxynaphthoyl-1'-aminobenzene,
26.3 parts of the magnesium salt of the diazoamino compound from diazotised 2.5-diethoxy-4-benzoylamino-1-aminobenzene and sarcosine and
50 parts of urea according to Example 1 a printing paste is obtained which yields in printing a clear greenish-blue.

Example 6

When using 13 parts of 2.3-hydroxynaphthoyl-1'-aminobenzene,
29.4 parts of the magnesium salt of the diazoamino compound from diazotised 2.5-dimethoxy-4-benzoylamino-1-aminobenzene and sarcosine and
50 parts of urea according to Example 1 a printing paste is obtained which yields in printing a clear reddish-blue.

Example 7

When using 13 parts of 2.3-hydroxynaphthoyl-1'-aminobenzene and
26.5 parts of the magnesium salt of the diazoamino compound from diazotised 2-methoxy-4-benzoylamino-5-methyl-1-aminobenzene and sarcosine according to Example 1 a printing paste is obtained which yields in printing a clear violet.

Example 8

When using 34 parts of 2.3-hydroxycarbazoyl-4'-chloro-1'-aminobenzene and
56 parts of the magnesium salt of the diazoamino compound from diazotised 4-toluidine and 5-sulfo-2-aminobenzoic acid according to Example 1 a printing paste is obtained which yields in printing a dark brown.

Example 9

A printing paste consisting of 28 parts of 2.3-hydroxynaphthoyl-1'-amino-2'-methylbenzene
65 parts of the diazoamino compound from diazotised 4-chloro-2-toluidine and magnesium 4-sulfo-2-aminobenzoate,
50 parts of glycol monoethylether,
120 parts of monoethylaminoethanol
252 parts of water and
500 parts of neutral starch-tragacanth thickener is employed according to Example 1 for printing. A clear red is obtained.

Example 10

A printing paste consisting of 28 parts of 2.3-hydroxynaphthoyl-1'-amino-2'-methylbenzene,
64 parts of the diazoamino compound from diazotised 4-chloro-2-toluidine and sodium 4-sulfo-2-aminobenzoate,
50 parts of glycol monoethylether,
120 parts of diethylaminoethanol,
238 parts of water and
500 parts of neutral starch-tragacanth-thickener is printed on the fiber and after drying at 50–60° C. steamed for about 3–5 minutes in the Mather-Platt. Now the print is rinsed and soaped as usual. A clear red is obtained. The printing paste is stable.

Example 11

If in Example 10 instead of diethylaminoethanol the same quantity of dimethylaminobutanone is used, likewise a good print is obtained when otherwise the procedure of Example 10 is followed.

Example 12

When using 13 parts of 2.3-hydroxynaphthoyl-1'-aminobenzene,
34.3 parts of the sodium salt of the diazoamino compound from diazotised 2-5-diethoxy-4-benzoylamino-1-aminobenzene and 3-tetramethylenesulfone-glycine of the following constitution:

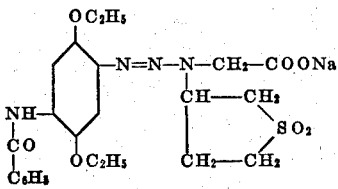

50 parts of glycol monoethylether,
120 parts of diethylaminoethanol,
50 parts of urea,
233 parts of water and
500 parts of neutral starch-tragacanth thickener according to Example 5 a printing paste is obtained which yields in printing the same clear blue.

Example 13

58 parts of a mixture consisting of a water-soluble diazoamino compound from diazotised 2.5-dimethoxy-4-benzoylamino-1-aminobenzene with the sodium salt of sarcosine and 2.3-hydroxynaphthoyl-1'-aminobenzene are worked up to a printing paste with 50 parts of glycol monoethylether
120 parts of diethylaminoethanol
50 parts of urea
222 parts of water and
500 parts of neutral starch-tragacanth thickener and printed on the fiber according to Example 5. A reddish blue is obtained. The printing paste is stable.

If instead of the mentioned mixture 53 parts of a mixture consisting of the diazoamino compound from diazotised 2.5-diethoxy-4-benzoyl-amino-1-aminobenzene with the sodium salt of methyltaurine and 2.3 - hydroxynaphthoyl-1'-aminobenzene is employed, a greenish-blue is obtained.

Example 14

When using
50 parts of a mixture consisting of a water-soluble diazoamino compound from diazotised 2 - methoxy - 4 - benzoylamino - 5 - methyl-1-aminobenzene with the sodium salt of sarcosine and 2.3-hydroxy-naphthoyl-1'-aminobenzene together with
50 parts of glycol mono-ethylether
120 parts of diethylaminoethanol
260 parts of water and
500 parts of neutral starch-tragacanth thickener a printing paste is obtained which yields on the fiber a clear violet.

Example 15

When using
90 parts of a mixture consisting of a water-soluble diazoamino compound from diazotised 2.5 - diethoxy - 4 - benzoylamino - 1 - aminobenzene with the sodium salt of sarcosine and the ortho-toluidide of ortho-hydroxy-anthracene-carboxylic acid, according to Example 14 a bluish-green is obtained.

Example 16

A printing paste consisting of
28 parts of 2.3-hydroxynaphthoyl-2'-methyl-1'-aminobenzene
40.6 parts of the diazoamino compound from diazotised 4-chloro-2-toluidine and sodium cyanamide,
50 parts of glycol monoethylether
120 parts of dimethylaminobutanone or 120 parts of diethylaminoethanol,
261 parts of water and
500 parts of neutral starch-tragacanth thickener yields when printed on the fiber, a clear red.

Example 17

When using
29.3 parts of 2.3-hydroxynaphthoyl-2'-methoxy-1'-aminobenzene,
70.1 parts of the sodium salt of the diazoamino compound from diazotised 2-chloro-5-trifluoromethyl-1-aminobenzene and 5-sulfo-2-ethylaminobenzoic acid,
50 parts of glycol monoethylether
120 parts of diethylaminoethanol
231 parts of water and
500 parts of neutral starch-tragacanth-thickener a printing paste is obtained, yielding, when printed on the fabric, a clear full orange.

Example 18

When using
28 parts of 2.3-hydroxynaphthoyl-2'-methyl-1'-aminobenzene,
69 parts of the sodium salt of the diazoamino compound from diazotised 4-chloro-2-toluidine and 4.4'-diaminodiphenyl-3.3'-dicarboxylic acid-6.6'-disulfonic acid
50 parts of glycol monoethylether
120 parts of dimethylaminobutanone
233 parts of water and
500 parts of neutral starch-tragacanth-thickener a printing paste is obtained yielding, when printed in the usual manner, a clear red.

Example 19

34 parts of 2.3-hydroxycarbozoyl-4'-chloro-1'-aminobenzene and
64 parts of the diazoamino compound from diazotised 5-nitro-2-toluidine and sodium 5-sulfo-2-ethylaminobenzoate and diethylaminoethanol are worked up in the usual manner to a printing paste, yielding, when printed on the fiber, a beautiful brown.

Example 20

When using
- 28 parts of 2.3-hydroxynaphthoyl-1'-amino-2'-methylbenzene
- 65 parts of the diazoamino compound employed in Example 2,
- 50 parts of glycol monoethylether
- 120 parts of N-propylaminoethyl alcohol
- 237 parts of water and
- 500 parts of neutral starch-tragacanth thickener a printing paste is obtained, yielding, when printed on the fiber, a clear red.

Example 21

- 80 parts of a preparation consisting of a water-soluble diazoamino compound from diazotised 4-sulfodiethylamide 2-anisidine with the sodium salt of 5-sulfo-2-ethylaminobenzoic acid and 2.3-hydroxynaphthoyl-2'.4' - dimethoxy - 5' - chloro - 1' - aminobenzene are made up to a paste with
- 50 parts of glycol monoethylether,
- 120 parts of dimethylaminobutanone
- 250 parts of water and
- 500 parts of neutral starch-tragacanth thickener.

This printing paste yields on the fiber a clear bluish red.

Example 22

When using in Example 17 instead of diethylaminoethanol
- 120 parts of dimethylaminoethanol or
- 120 parts of dimethylaminobutanone a printing paste is obtained which yields, when printed on the fiber, the same clear orange.

Example 23

- 53 parts of a mixture consisting of the diazoamino compound from diazotised 2.5-diethoxy-4 - benzoylamino - 1 - aminobenzene with the sodium salt of sarcosine and 2.3-hydroxynaphthoyl-1'-aminobenzene are worked up in the usual manner to a printing paste with
- 50 parts of urea
- 50 parts of glycol monoethylether
- 120 parts of dimethylaminoethanol or dimethylaminobutanone
- 227 parts of water and
- 500 parts of neutral starch-tragacanth thickener and printed on the fiber according to Example 5. A greenish-blue is obtained.

Example 24

- 14 parts of 2.3-hydroxynaphthoyl-1'-amino-2'-methylbenzene and
- 52 parts of the barium salt of the diazoamino compound from diazotised 2.5-diethoxy-4-benzoyl-amino-1-aminobenzene and sarcosine are worked up to a printing paste according to Example 13 yielding, when printed on the fiber, a greenish-blue.

Example 25

A printing paste consisting of
- 28 parts of 2.3-hydroxynaphthoyl-1'-amino-2'-methylbenzene,
- 42 parts of the diazoamino compound from diazotised 4-chloro-2-toluidine and the sodium salt of ethylenediaminodiacetic acid
- 50 parts of glycol monoethylether
- 120 parts of diethylaminoethanol
- 260 parts of water and
- 500 parts of neutral starch-tragacanth thickener is printed on the fabric. The print is developed in the usual manner in the Mather-Platt, rinsed and soaped. A clear red is obtained.

Example 26

A printing paste consisting of
- 13 parts of 2.3-hydroxynaphthoyl-1'-aminobenzene
- 27 parts of the diazoamino compound from diazotised 2.5-diethoxy-4-benzoylamino-1-benzene and methylglucamine
- 50 parts of urea
- 50 parts of glycol monoethylether
- 120 parts of diethylaminoethanol
- 240 parts of water and
- 500 parts of neutral starch-tragacanth thickener yields, when printed on the fiber, a greenish-blue.

Example 27

When using instead of the diazoamino compound mentioned in Example 26.
- 33 parts of the diazoamino compound from diazotised 2.5-diethoxy-4-benzoylamino-1-aminobenzene and sodium piperidine-3-sulfonate a printing paste is obtained which likewise yields on the fiber a greenish blue.

Example 28

When using
- 80 parts of a mixture consisting of a water-soluble diazoamino compound from diazotised 2-chloro-5-trifluoromethyl-1-aminobenzene with the sodium salt of 5-sulfo-2-ethylaminobenzoic acid and 2.3-hydroxynaphthoyl-2'-methoxy - 1' - aminobenzene and
- 50 parts of glycol monoethylether
- 120 parts of N-oxethylpyrrolidine
- 250 parts of water and
- 500 parts of neutral starch-tragacanth thickener a printing paste is obtained which yields on the fiber a clear orange.

Example 29

A printing paste consisting of
- 28 parts of 2.3-hydroxynaphthoyl-1'-amino-2'-methylbenzene
- 28.9 parts of the diazoamino compound from diazotized 5-nitro-2-anisidine and the magnesium salt of 5-sulfo-2-ethylaminobenzoic acid
- 50 parts of glycol monoethylether
- 120 parts of diethylaminoethanol
- 273 parts of water and
- 500 parts of neutral starch-tragacanth thickener yields, when printed on the fiber, a full bordeaux.

Example 30

When using
- 80 parts of a mixture consisting of a water-soluble diazoamino compound from diazotised 2.5-dichloroaniline with the sodium salt of 5-sulfo-2-ethylaminobenzoic acid and 2.3-hydroxy-naphthoyl-1'-amino-2'-ethoxybenzene and
- 50 parts of glycol monoethylether
- 120 parts of diethylaminoethanol
- 250 parts of water and
- 500 parts of neutral starch-tragacanth thickener a printing paste is obtained which yields, when printed on the fiber, a clear orange.

Example 31

When using 80 parts of a mixture consisting of a water-soluble diazoamino compound from diazotised 2.5-dichloroaniline with the sodium salt of 5-sulfo-2-ethylaminobenzoic acid and 2.3-hydroxynaphthoyl-1'-amino-2'-methoxybenzene and otherwise working according to Example 30 a printing paste is obtained yielding, when printed on the fiber, a clear scarlet.

Example 32

When using 92 parts of a mixture consisting of a diazoamino compound from diazotised 4-chloro-2-toluidine with the magnesium salt of 4-sulfo-2-aminobenzoic acid and 2.3-hydroxynaphthoyl - 1' - amino - 2' - methylbenzene and 50 parts of glycol monoethylether 120 parts of isobutylethanolamine or monoisopropylethanolamine or dipropylethanolamine, 238 parts of water and 500 parts of neutral starch-tragacanth thickener a printing paste is obtained which yields on the fiber a clear red.

I claim:

1. In the process of preparing azo dyestuffs from coupling components and such diazoamino compounds as contain water-solubilizing groups in the radical attached to the amino-nitrogen and can be split off into the diazo compound and the amine by a reduction in the alkalinity of the preparation, in the presence of volatile bases, wherein by simply applying heat in the presence of moisture the diazoamino compound is decomposed with the formation of the corresponding diazo compound and coupling of the diazo compound with the coupling component takes place, the modification which comprises employing as volatile bases oxygen-containing, water-soluble nitrogenous organic bases volatile with steam.

2. The process as claimed in claim 1 wherein the preparation of the azo dyestuff is effected on the fiber, the heat treatment being effected by steaming.

3. The process as claimed in claim 1 wherein as volatile, oxygen-containing, water-soluble nitrogenous organic bases such bases are employed as contain hydroxyalkyl groups.

4. The process as claimed in claim 1 wherein as volatile, oxygen-containing, water-soluble nitrogenous organic bases such bases are employed as contain oxethyl groups.

5. The process as claimed in claim 1 wherein diethylamino-ethanol is employed as volatile, oxygen-containing, water-soluble nitrogenous organic base.

6. The dye compositions comprising ice colour coupling components, diazoamino compounds which contain water-solubilising groups in the radicals attached to the amino nitrogen and can be split off into the diazo compounds and the amines by reducing the alkalinity of the preparations, and volatile, oxygen-containing, water-soluble nitrogenous organic bases volatile with steam, coupling components and diazo amino compounds being dissolved in said bases.

7. The preparations as claimed in claim 6 wherein as volatile, oxygen-containing, water-soluble nitrogenous organic bases such bases are employed as contain hydroxyalkyl groups.

8. The preparations as claimed in claim 6 wherein as volatile, oxygen-containing, water-soluble nitrogenous organic bases such bases are employed as contain oxethyl groups.

9. The preparations as claimed in claim 10 wherein diethylaminoethanol is employed as volatile, oxygen-containing, water-soluble, nitrogenous organic base.

10. The dye compositions comprising ice-colour coupling components, diazoamino compounds, which contain acid, salt-forming solubilising groups in the radicals attached to the amino nitrogen and can be split off into the diazo compounds and the amines by reducing the alkalinity of the preparations, in the form of alkali metal salts, and volatile, oxygen-containing, water-soluble nitrogenous organic bases, coupling components and diazo amino compounds being dissolved in said bases.

11. The preparations as claimed in claim 10 wherein as volatile, oxygen-containing, water-soluble nitrogenous organic bases such bases are employed as contain hydroxyalkyl groups.

12. The preparations as claimed in claim 10 wherein as volatile, oxygen-containing, water-soluble nitrogenous organic bases such bases are employed as contain oxethyl groups.

13. The preparations as claimed in claim 10 wherein diethylaminoethanol is employed as volatile, oxygen-containing water soluble, nitrogenous organic base.

ALBERT SCHMELZER.